United States Patent
Wadhwa et al.

(10) Patent No.: US 12,517,940 B1
(45) Date of Patent: Jan. 6, 2026

(54) MACHINE LEARNING TECHNIQUES FOR ANOMALY DETECTION

(71) Applicant: Dell Products L.P., Round Rock, TX (US)

(72) Inventors: Sumit Wadhwa, Austin, TX (US); Souvik Nath, Howrah (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/888,550

(22) Filed: Sep. 18, 2024

(51) Int. Cl.
| | |
|---|---|
| G06F 16/30 | (2019.01) |
| G06F 16/215 | (2019.01) |
| G06F 16/2458 | (2019.01) |
| G06F 16/35 | (2019.01) |
| G06F 17/18 | (2006.01) |
| G06F 30/27 | (2020.01) |

(52) U.S. Cl.
CPC ........... G06F 16/35 (2019.01); G06F 16/215 (2019.01); G06F 16/2462 (2019.01); *G06F 17/18* (2013.01); *G06F 30/27* (2020.01)

(58) Field of Classification Search
CPC .... G06F 16/215; G06F 16/2462; G06F 16/35; G06F 17/18; G06F 30/27
See application file for complete search history.

(56) References Cited

U.S. PATENT DOCUMENTS

| | | | | |
|---|---|---|---|---|
| 2019/0205743 A1* | 7/2019 | Jiang | | G06F 16/313 |
| 2024/0333615 A1* | 10/2024 | Ford | | H04L 43/045 |
| 2025/0021794 A1* | 1/2025 | Yang | | G06N 3/044 |

OTHER PUBLICATIONS

Zhou, Xiaokang, et al. "Siamese neural network based few-shot learning for anomaly detection in industrial cyber- physical systems." IEEE Transactions on Industrial Informatics, vol. 17, No. 8, Aug. 2020, pp. 5790-5798.

Nag, R., A Comprehensive Guide to Siamese Neural Networks, Medium, available at: https://medium.com/@rinkinag24/a-comprehensive-guide-to-siamese-neural-networks-3358658c0513 (last accessed Sep. 18, 2024), Nov. 19, 2022.

* cited by examiner

*Primary Examiner* — Diedra McQuitery
(74) *Attorney, Agent, or Firm* — Ryan, Mason & Lewis, LLP

(57) ABSTRACT

Methods, apparatus, and processor-readable storage media for machine learning-based anomaly detection are provided herein. An example method includes obtaining a set of data record pairs, where each of at least a subset of the data record pairs comprise a target data record to be classified and a historical data record that is labeled as anomalous, and processing the set of data record pairs by at least two neural networks that generate respective embeddings for the data record pairs in the set. The method includes calculating a similarity score between the generated embeddings for each of the data record pairs in the set of data record pairs, classifying the target data record as anomalous in response to determining that at least one of the similarity scores satisfies a first threshold, and initiating one or more automated actions in response to the target data record being classified as anomalous.

20 Claims, 9 Drawing Sheets

| TYPE OF PAIR | SCENARIO | NUMBER OF SAMPLES (TRAINING) | DEPENDENT VARIABLE (Y) |
|---|---|---|---|
| POSITIVE PAIR | SIMILAR PAIRS: ANOMALOUS (Y=1) – ANOMALOUS (Y=1) | $^{N}C_2$ | 1 |
| POSITIVE PAIR | SIMILAR PAIRS: UNLABELED (Y=0) – UNLABELED (Y=0) | $^{M}C_2$ | 1 |
| NEGATIVE PAIR | DISSIMILAR PAIRS: ANOMALOUS (Y=1) – UNLABELED (Y=0) | N × 500 | 0 |

| SCENARIO | PAIR TYPE | NOTATION | NUMBER OF DATA SAMPLES | NUMBER OF SAMPLES WITH SIMILARITY SCORE > SECOND THRESHOLD | CLASSIFICATION RULE |
|---|---|---|---|---|---|
| $x_{e(y=1)}$ | SIMILAR | $x_{e(y=1)} - x_{k(y=1)}$; $k \in (1, n)$ | $n^+_1$ | $n^{+'}_1$ | If $n^{+'}_1 > n^{-'}_1$ then prediction = 1, otherwise prediction = 0 |
| | DISSIMILAR | $x_{e(y=1)} - x_{j(y=0)}$; $k \in (1, n)$ | $n^-_1$ | $n^{-'}_1$ | |
| $x_{e(y=0)}$ | DISSIMILAR | $x_{e(y=0)} - x_{k(y=1)}$; $k \in (1, n)$ | $n^-_2$ | $n^{-'}_2$ | If $n^{-'}_2 > n^{+'}_2$ then prediction = 1, otherwise prediction = 0 |
| | SIMILAR | $x_{e(y=0)} - x_{j(y=0)}$; $k \in (1, n)$ | $n^+_2$ | $n^{+'}_2$ | |

MACHINE LEARNING TECHNIQUES FOR ANOMALY DETECTION

BACKGROUND

Anomaly detection generally refers to techniques for identifying patterns or events that deviate from an expected behavior. These techniques can have a variety of applications, including detection of cyberattacks, identification of fraudulent transactions and prediction of equipment failures, as non-limiting examples.

SUMMARY

Illustrative embodiments of the disclosure provide techniques for machine learning-based anomaly detection. An exemplary computer-implemented method includes obtaining a first set of data record pairs, where each of at least a subset of the data record pairs in the first set comprises a target data record to be classified and a historical data record that is labeled as anomalous, and processing the first set of data record pairs by a first neural network and a second neural network having at least partially shared weights, where the first neural network and the second neural network generate respective embeddings for the data records in a given one of the data record pairs in the first set. The method includes calculating a similarity score between the generated embeddings for each data record pair in the first set of data record pairs, and in response to determining that at least one of the similarity scores satisfies a first threshold, classifying the target data record as anomalous. The method also includes initiating one or more automated actions in response to the target data record being classified as anomalous.

Illustrative embodiments can provide significant advantages relative to conventional techniques. For example, technical problems associated with detecting anomalies (such as rare event anomalies) are mitigated in one or more embodiments by implementing a twin machine learning model architecture that can accurately detect such anomalies even when there is limited training data available.

These and other illustrative embodiments described herein include, without limitation, methods, apparatus, systems, and computer program products comprising processor-readable storage media.

BRIEF DESCRIPTION OF THE DRAWINGS

FIG. 3 shows a data sampling configuration in an illustrative embodiment.

FIG. 5 shows another classification procedure in an illustrative embodiment.

DETAILED DESCRIPTION

Figure 1:
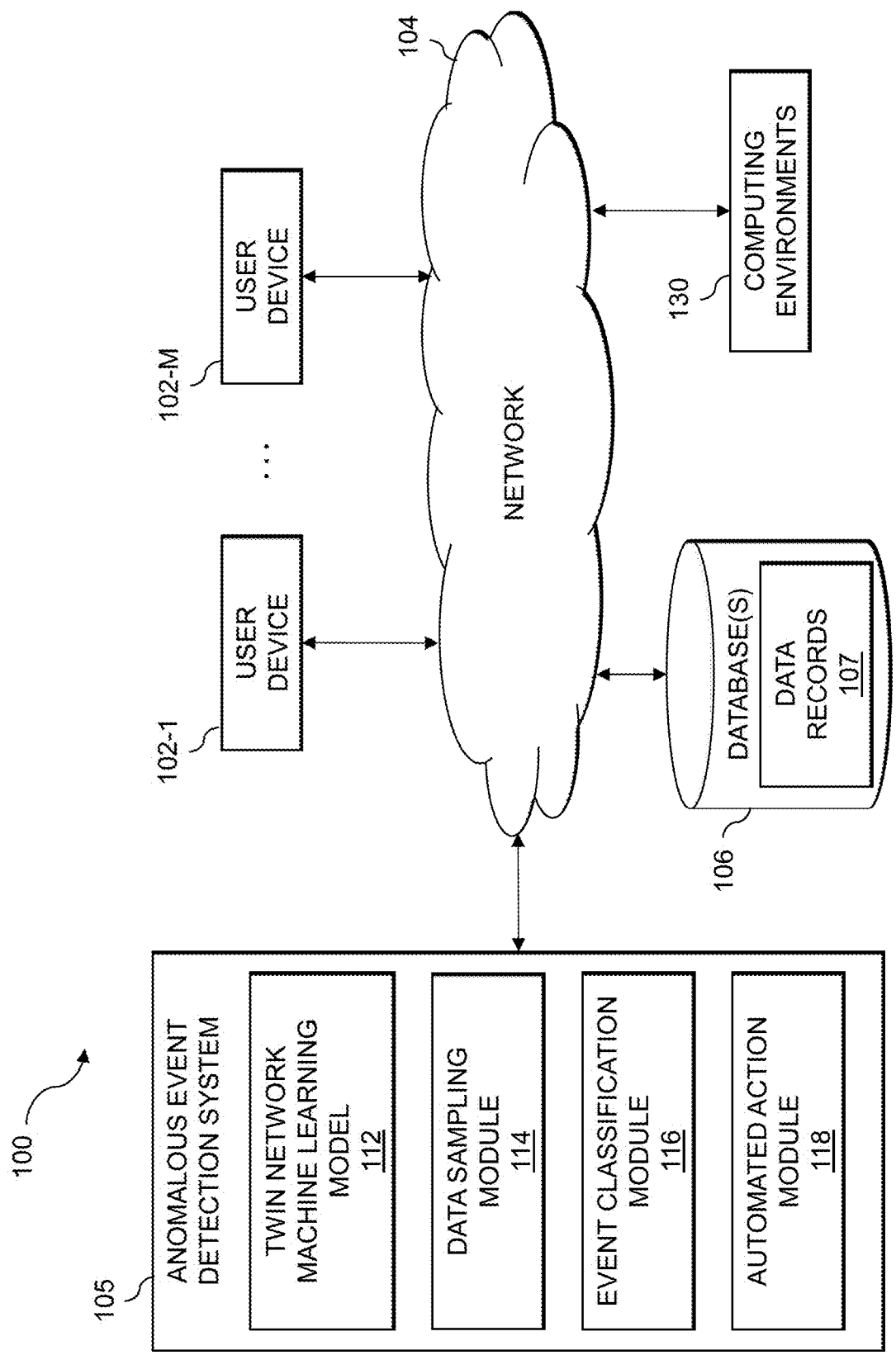
FIG. 1 shows an information processing system configured for machine learning-based anomaly detection in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Anomaly detection can be an important factor in mitigating potential threats or enabling informed decision-making, for example. Rare event detection is a particular type of anomaly detection, where the objective is to detect events with high impact but low probability. As used in this context and elsewhere herein, the term "rare event" is intended to be broadly construed so as to encompass an occurrence of an event with a low probability of happening within a given context, process, or system. A rare event, in some embodiments, can be based on whether a frequency of occurrence of an event falls below a configurable threshold within a defined dataset and/or timeframe.

In some embodiments, a gray market transaction can be considered as an example of a rare event. The gray market generally refers to the trade of products via a distribution channel that is unauthorized, unofficial and/or unintended by the original manufacturer and/or distributor. Gray markets often include genuine products that have slipped out of the normal distribution cycle and/or are imported into a market for sale without the consent or knowledge of the original manufacturer or owner. These products are generally sold at lower prices than those offered by authorized distribution partners. Authorized price differentials to different markets and customers have created an opportunity for certain enterprises, such as brokers, to purchase branded products in one location at discounted rates and then move them to locations where they can bring greater profits. Gray markets have several negative consequences for the product's manufacturer and/or distributor, including decreased revenues, margin erosion, a negative reputation, service issues, warranty issues and/or reduced customer satisfaction.

Detecting rare events is particularly challenging as there is often limited data and such events may not necessarily deviate significantly from normal behavior. For example, conventional techniques generally rely on machine learning models that treat rare events as a binary classification problem where the classification of whether or not an event is a rare event is performed when the event is occurring. However, this approach has several disadvantages.

Using gray markets as an example, there are often large quantities of transactions (e.g., millions or more) that are occurring. In order to generate training data, an investigation is performed to determine whether a given one of the transactions is a gray market transaction or not.

Some techniques attempt to address imbalanced classification problems wherein limited positively labeled data is available by performing various class balancing techniques, such as oversampling or undersampling, and assigning penalties to cross-entropy loss functions based on a majority-to-minority ratio, for example. However, these techniques also have several disadvantages including: increasing the likelihood of overfitting due to oversampling; discarding potentially useful information by undersampling; penalizing cost functions (such as weighted cross entropy) which can lead to uncalibrated classifiers causing over or under-prediction in one or more cases; and not being suitable for noisy data. Additionally, unlabeled datasets often have undetected anomalous data, which can result in a large number of false negatives. As a result, such techniques often suffer from a high false negative rate.

Embodiments described herein address such challenges by effectively removing the risk of creating synthetic or repeated samples of minority classes through oversampling or discarding information through undersampling, thereby improving the performance of the machine learning model. In some embodiments, a twin machine learning model architecture is configured to accurately detect rare events even when there is limited training data available.

FIG. 1 shows a computer network (also referred to herein as an information processing system) 100, which is configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an anomalous event detection system 105 and one or more computing environments 130.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the anomalous event detection system 105 can have at least one associated database 106 configured to store data records 107 pertaining to, for example, a set of events. The set of events may include one or more rare events, for example.

An example database 106, such as depicted in the present embodiment, can be implemented using one or more storage systems associated with the anomalous event detection system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

The one or more computing environments 130 can comprise one or more servers corresponding to one or more organizations for providing services or applications (e.g., to the user devices 102). As a non-limiting example, the computing environments 130 can be configured to process user transactions related to products and/or services.

Also associated with the anomalous event detection system 105 are one or more input-output devices, which illustratively comprise keyboards, displays or other types of input-output devices in any combination. Such input-output devices can be used, for example, to support one or more user interfaces to the anomalous event detection system 105, as well as to support communication between the anomalous event detection system 105 and other related systems and devices not explicitly shown.

Additionally, the anomalous event detection system 105 in the FIG. 1 embodiment is assumed to be implemented using at least one processing device. Each such processing device generally comprises at least one processor and an associated memory, and implements one or more functional modules for controlling certain features of the anomalous event detection system 105.

More particularly, the anomalous event detection system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

A network interface may allow the anomalous event detection system 105 to communicate over the network 104 with the user devices 102, and illustratively comprises one or more conventional transceivers.

The anomalous event detection system 105 further comprises a twin network machine learning model 112, a data sampling module 114, an event classification module 116, and an automated action module 118.

In some embodiments, the twin network machine learning model 112 utilizes a machine learning architecture comprising two identical feedforward neural networks that share a set of weights. The feedforward neural networks can learn to represent data samples (e.g., corresponding to data records 107) as embeddings, where the embeddings encode one or more characteristics of the data samples. According to some embodiments, the twin network machine learning model 112 can quantify a similarity between a pair of data samples by comparing embeddings generated for the pair of data samples. The similarity can be transformed into a probability using a Sigmoid activation function, where the probability indicates a likelihood that the data samples in the pair belong to a same class (e.g., a rare event class or a regular class), as described in more detail elsewhere herein.

The data sampling module 114 can be configured to generate a training dataset for training the twin network machine learning model 112. The training dataset is generated based on a sampling algorithm that selects pairs of data samples from each class (e.g., rare events and regular events). In some embodiments, the sampling algorithm can generate diverse data pairs, including similar and dissimilar examples. The data sampling module 114, in some embodiments, can increase the number of scenarios for the twin network machine learning model 112 to learn from using a limited portion of the dataset, which can generally be referred to as few-shot learning or n-shot learning.

The event classification module 116 utilizes the output of the trained twin network machine learning model 112 to classify incoming data records. For example, the data record can be classified as a regular event or an anomalous event, such as a rare event.

The automated action module 118 is configured to initiate one or more automated actions based on the classifications made by the event classification module 116. For example, the automated actions can include triggering one or more alerts or logging information in response to a data record being classified as an anomalous event. The one or more automated actions can be dependent on the context (e.g., types of the data records 107). As a non-limiting example, if a data record for a product and/or service between the user device 102-1 and the computing environments 130 is classified as being a gray market transaction, then the automated actions can include preventing the transaction from being processed, sending one or more alerts to a user (e.g., associated with the user device 102-1) or a system administrator (e.g., associated with the computing environments 130) and/or logging information related to the gray market transaction (e.g., to be used for further improving the twin network machine learning model 112).

It is to be appreciated that this particular arrangement of elements 112, 114, 116 and 118 illustrated in the anomalous event detection system 105 of the FIG. 1 embodiment is presented by way of example only, and alternative arrangements can be used in other embodiments. For example, the functionality associated with the elements 112, 114, 116 and 118 in other embodiments can be combined into a single module, or separated across a larger number of modules. As another example, multiple distinct processors can be used to implement different ones of the elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for anomalous event detection system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the anomalous event detection system 105, the databases 106 and/or the computing environments 130 can be on and/or part of the same processing platform.

An exemplary process utilizing elements 112, 114, 116 and 118 of an example anomalous event detection system 105 in computer network 100 will be described in more detail with reference to, for example, the flow diagram of FIG. 7.

In gray markets, for example, illustrative embodiments can identify market entities prior to a transaction even being converted into an order (e.g., when a customer reaches out to a sales team) using a machine learning model. Instead of learning a decision boundary separating anomalous and non-anomalous data records, some embodiments can identify and score similarities and/or dissimilarities between new data records and known historical anomalous data records and between new data records and historical unlabeled data records. These similarity scores can then be used for classification purposes. In at least one embodiment, gray market transactions in a dataset are treated as anomalous data points or samples, and the remaining transactions in the dataset are treated as non-anomalous data points or samples.

A dataset pertaining to gray market transactions, for example, may encompass details such as pricing data, product details and/or characteristics associated with users, businesses and/or organizations involved in such transactions. In some embodiments, the data is assumed to be in a tabular format and/or text format. It is to be appreciated that different types and numbers of features can be used based on the context.

Figure 2:
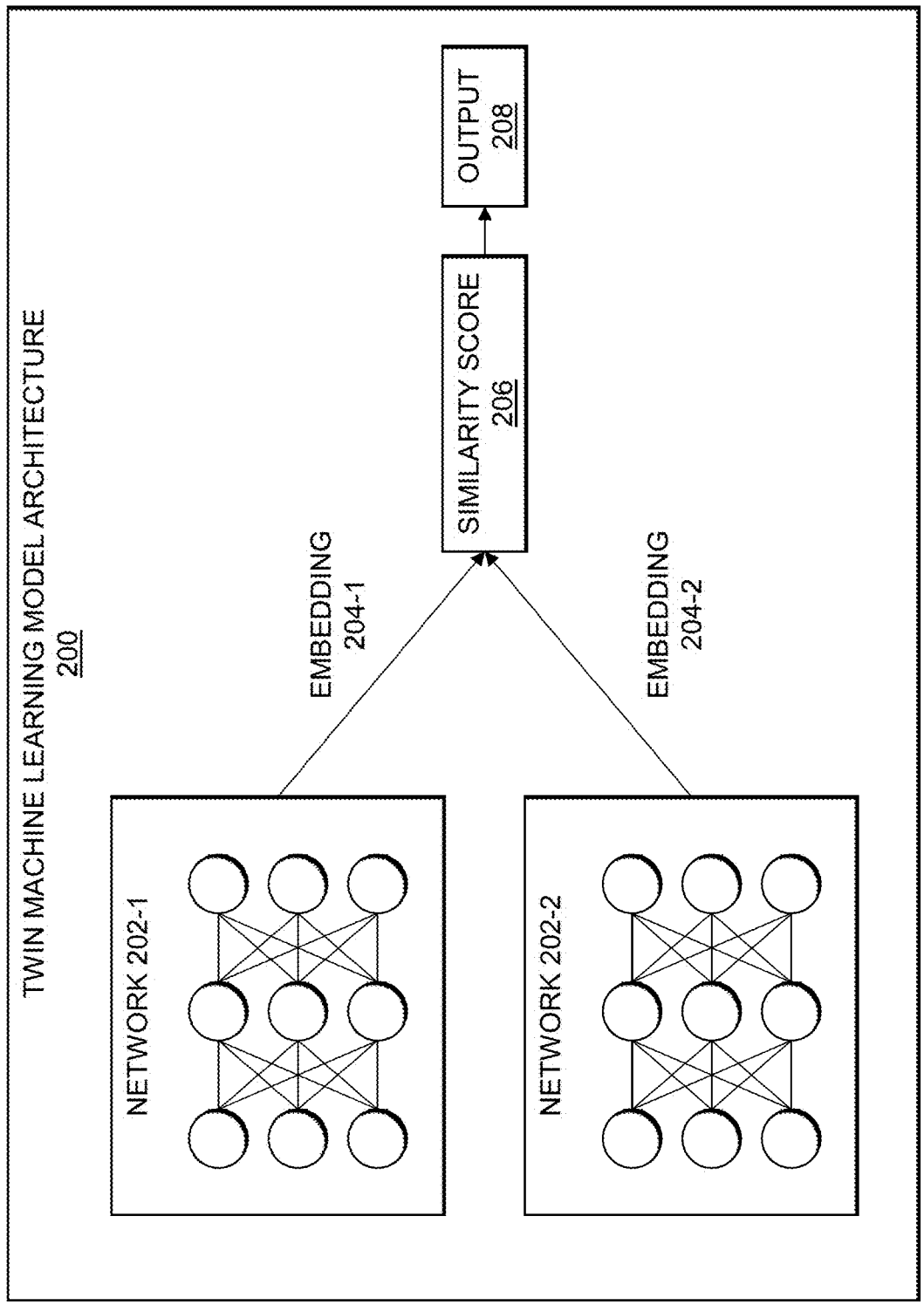
FIG. 2 shows an example of a twin machine learning model architecture in an illustrative embodiment.

FIG. 2 shows an example of a twin machine learning model architecture 200 in an illustrative embodiment. The twin machine learning model architecture 200 can be used to implement the twin network machine learning model 112, for example.

The twin machine learning model architecture 200 includes networks 202-1 and 202-2 (collectively referred to herein as networks 202). In some embodiments, the networks 202 comprise identical neural networks that have the same architecture. For example, the networks 202 have the same number of layers, same types of neurons (represented by circles in FIG. 2), and same connection weights (represented by the lines between the neurons). Generally, the twin machine learning model architecture 200 obtains a pair of inputs, and each of the networks 202 processes a corresponding one of the inputs in the pair. The twin machine learning model architecture 200, in some embodiments, can be trained to identify similarities and dissimilarities between flagged (e.g., labeled) rare event cases and unflagged (e.g., unlabeled) rare event cases.

In at least some embodiments, the networks 202 can correspond to feedforward neural networks having shared weights through which the inputs are processed. A feedforward neural network can include an input layer, one or more hidden layers that process the input data through a series of transformations to extract meaningful features from the input, and an output layer that generates an embedding (e.g., a representation) of the input data. The representation can comprise a vector (e.g., a 128-dimensional vector) that encodes characteristics of the input data. A given embedding can be denoted herein as $e_i$.

In the FIG. 2 example, it is assumed that the network 202-1 generates an embedding 204-1, and the network 202-2 generates an embedding 204-2. By sharing the weights, the networks 202 learn substantially the same set of features from the input data, which can help ensure that similar inputs produce similar embeddings.

A similarity score 206 is calculated based on the embeddings 204-1 and 204-2, which quantifies a similarity between the embeddings 204-1 and 204-2. As non-limiting examples, the similarity score 206 can be based on a Euclidean distance and/or a cosine similarity. In some embodiments, the similarity score 206 is passed through a Sigmoid activation function to convert the similarity score 206 into an output 208. The output 208 can correspond to a probability of whether the two inputs are similar or dissimilar.

In some embodiments, a process for creating a twin model architecture (e.g., twin machine learning model architecture 200) can include creating a base neural network architecture based on a set of parameters. The set of parameters may include, for example, input dimensions, a number of layers, sizes of the layers, dropout rates and types of activation functions for each layer. Two inputs (input1 and input2) are defined with the specified input dimensions, and the identical copies of the base neural network architecture are created using input1 and input2. The similarity measure between the outputs of the twin models is calculated using Euclidean distance. The output of the similarity measure calculation is passed through a dense layer with a Sigmoid activation function. The twin model architecture is then created such that it takes both input1 and input2 as input to generate the output. In some embodiments, the twin model architecture can be trained with a loss function (e.g., a binary cross-entropy loss function) and an optimizer (e.g., an adaptive moment estimation (ADAM) optimizer) based on a set of evaluation metrics (e.g., accuracy, precision and/or recall). It is to be appreciated that this is merely an example of a process for creating the twin model architecture, and other processes are also possible. For example, the base neural network architecture can be modified based on the complexity and/or nature of the classification problem. Alternatively, or additionally, different similarity measures can also be used (e.g., a cosine similarity) and/or different types of network architectures can be used (e.g., network architectures having more than two models and/or having different sets of weights).

To train the twin model architecture, data can be prepared in pairs. For example, the pairs can include similar pairs (e.g., rare event-rare event pairs and/or regular event-regular event pairs) and dissimilar pairs (e.g., rare event-regular event pairs).

FIG. 3 shows a data sampling configuration 300 in an illustrative embodiment. In some embodiments, the data sampling configuration 300 can be used to generate a dataset for training a machine learning network, such as the twin machine learning model architecture 200 shown in FIG. 2, for example.

In the data sampling configuration 300, Y is a dependent variable corresponding to a type of class. For example, Y=1 can correspond to a class where pairs of data records are similar (referred to as positive sampling), and Y=0 can correspond to another class where pairs of data records are dissimilar (referred to as negative sampling). It is noted that Y=1 and Y=0 belong to classes used during training so that a machine learning network learns how to score the data pairs for similarity and dissimilarity. Once the machine learning network is trained, Y can be used to classify new data records into different sets of classes, such as y=0 and y=1, where y=1 corresponds to records of interest (e.g., anomalous data records) and y=0 corresponds to data records that are not of interest.

In some embodiments, a relatively large number of pairs are used for each type of data record pair. As a non-limiting example, in the data sampling configuration 300, the number of similar positive pairs can be 719,400 with N=1200, the number of unlabeled pairs can be 719,400 selected randomly from 50 million pairs generated from an unlabeled dataset with M=10,000, and the number of negative pairs can be 600,000 with N=1200. In the data sampling configuration 300, the dependent variable, Y, represents a binary label indicating whether two data records are similar or not. In this example, a value of Y=1 indicates that a pair is similar, and Y=0 indicates that a pair is dissimilar. The data sampling configuration 300 includes:

1. Positive data record pairs selected from X that are labeled as belonging to a class of interest (y=1).
2. Positive data record pairs selected from X that are unlabeled. In some embodiments, it is assumed that unlabeled data records belong to another class (y=0) as some types of anomalies (e.g., rare events) have a low probability of occurring.
3. Negative data record pairs, where one data record of the pair is selected from X that is labeled as belonging to a class of interest (y=1), and the other data record in the pair is selected from X and is unlabeled and/or belongs to another class (y=0).

Some embodiments can include generating a set of positive data record pairs, $^{N}C_{2}$, where N is the number of records or a derived data record belonging to the class of interest (y=1), and a set of positive sample pairs, $^{N}C_{2}$, by randomly selecting $^{N}C_{2}$ pairs from $^{M}C_{2}$, where M is the number of records or a derived sample belonging to the other class (y=0). Generally, M is much greater than N for a given dataset. Additionally, a set of negative data record pairs, N×500, is generated, where N is a number of records or a derived sample belonging to the class of interest (y=1), and 500 is the number of sample records taken from the other class (y=0). It is noted that the fixed multiplier (which is 500 in this example), is configurable depending on the dataset.

The sampling algorithm can advantageously increase the number of different scenarios for the twin network machine learning model to learn from while using a relatively small portion of the overall dataset. This can be considered as an alternative to using traditional oversampling (e.g., random or synthetic minority over-sampling technique (SMOTE)) for imbalanced classification problems. The samples drawn from the population have been drawn randomly for this purpose. A variety of other sampling methodologies can be used to create a more representative sample set, for example.

According to some embodiments, a machine learning network (e.g., the twin network machine learning model 112) can be used for classification after the machine learning network has been trained. Typically, weights for a machine learning network are trained to distinguish between two samples and are used in a transfer learning setting. Instead of transfer learning, some embodiments described herein can use similarity scores for classifying whether a sample belongs to the positive or negative class.

For example, a classification algorithm that can be used by the anomalous event detection system 105 can include a step of determining, for each target data record $(X_{e(y=c \in [0, 1])})$, if the similarity score of $X_e$ with any instance of its class of interest satisfies a first configured threshold (e.g., 0.99). If so, then the target data record $X_e$ is labeled as belonging to the class of interest.

For target data records, $X_e$, that do not satisfy the first threshold, then a classification procedure can be applied. A non-limiting example of a classification procedure is described in conjunction with FIGS. 4 and 5.

Figure 4:
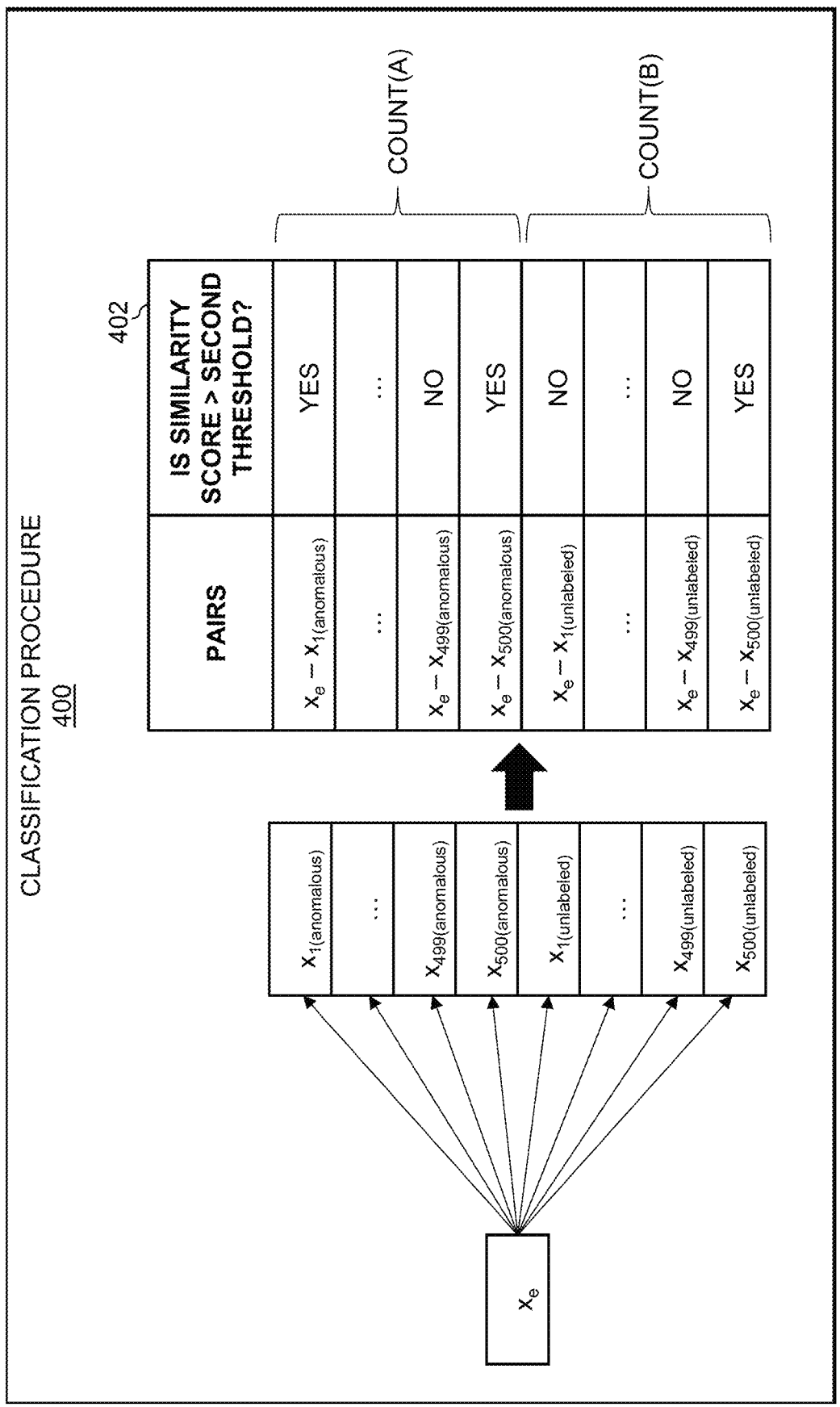
FIG. 4 shows a classification procedure in an illustrative embodiment.

FIG. 4 shows an example of a classification procedure 400 in an illustrative embodiment. In this example, the classification procedure 400 computes similarity scores for data record pairs, where each data record pair includes the target data record $X_e$. In this example, the data record pairs include a first set of five-hundred data record pairs, where each pair in the first set includes the target data record $X_e$ and a data record from the class of interest. The data records from the class of interest are denoted $X_{1(anomalous)}, \ldots X_{500(anomalous)}$. The data record pairs also include a second set of five-hundred data record pairs, where each pair in the second set includes the target data record $X_e$ and an unlabeled data record. The unlabeled data records are denoted $X_{1(unlabeled)}, \ldots X_{500(unlabeled)}$.

The similarity scores computed for the first set of data record pairs are compared to a second threshold (e.g., 0.95), as shown in column 402. The number of pairs in the first set that satisfy the second threshold is counted (denoted as count (A) in FIG. 4). The similarity scores are computed for the second set of data record pairs, which are also compared to the second threshold, as shown in column 402. The number of pairs in the second set that satisfy the second threshold is counted (denoted as count (B) in FIG. 4). If A is greater than B, then the target data record $X_e$ is classified as anomalous (e.g., y=1). Otherwise, the target data record $X_e$ is classified as non-anomalous (e.g., y=0).

FIG. 5 shows another classification procedure in an illustrative embodiment. Specifically, the classification procedure 500 computes similarity scores for similar (or positive) pairs and dissimilar (or negative) pairs with target data record, $X_e$, for each class (e.g., y=1 and y=0). More specifically, for $X_{e(y=1)}$, the number of similar pairs of data records is denoted $n^+_1$, and the number of dissimilar pairs of data records is denoted $n^-_1$. For $X_{e(y=0)}$, the number of similar pairs of data records is denoted $n^+_2$, and the number of dissimilar pairs of data records is denoted $n^-_2$.

For $X_{e(y=1)}$, the classification procedure 500 also determines a number, $n^+_1{}'$, of the similarity scores computed for similar pair types that satisfy a second configured threshold (e.g., 0.95), and a number, $n^-_1{}'$, of the similarity scores computed for dissimilar pair types that satisfy the second configured threshold. If $n^+_1{}'>n^-_1{}'$, then the given data record is classified as belonging to the class of interest (e.g., y=1). Otherwise, the given data record is classified as not belonging to the class of interest (e.g., y=0).

Similarly, for $X_{e(y=0)}$, the classification procedure 500 determines a number, $n^+_2{}'$, of the similarity scores computed for similar pair types that satisfy the second configured threshold, and a number, $n^-_2{}'$, of the similarity scores computed for dissimilar pair types that satisfy the second configured threshold. If $n^-_2{}'>n^+_2{}'$, then the given data record is classified as belonging to the class of interest (e.g., y=1). Otherwise, the given data record is classified as not belonging to the class of interest (e.g., y=0).

It is to be appreciated that a variety of other measures can be used such as computing a sum, a mean or a median of similarity scores per data record set per example that can be used for classification purposes.

Figure 6:
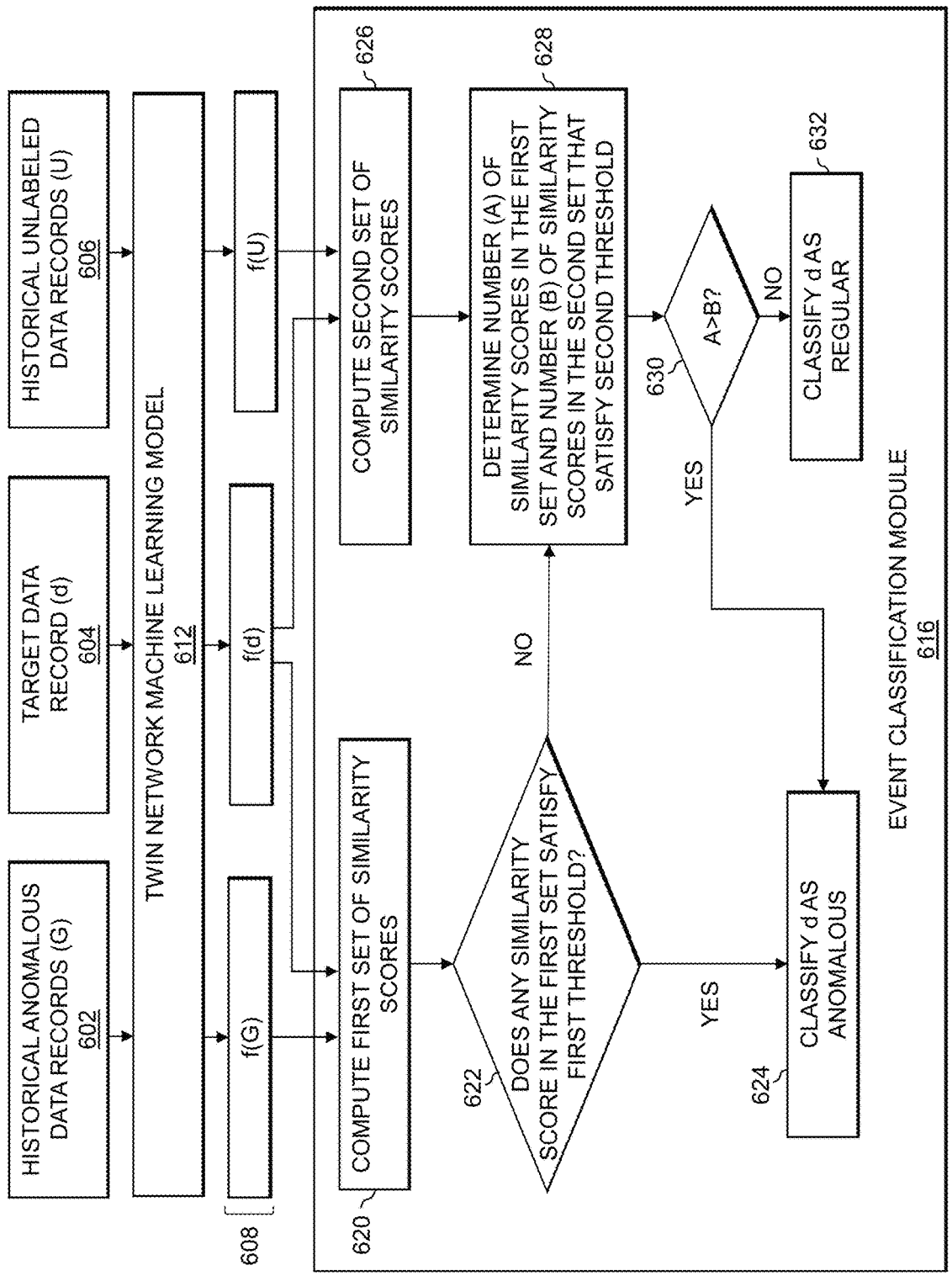
FIG. 6 shows a classification architecture in an illustrative embodiment.

FIG. 6 shows a classification architecture in an illustrative embodiment. In the example shown in FIG. 6, the classification architecture includes a twin network machine learning model 612 and an event classification module 616. The twin network machine learning model 612 processes one or more historical anomalous data records (G) 602, a target data record (d) 604 and one or more historical unlabeled data records (U) 606 to generate embeddings 608. The embeddings 608 include a set of embeddings (denoted f(G)), which includes an embedding of each of the one or more historical anomalous data records 602, an embedding (denoted f(d)) for the target data record (d) 604 and a set of embeddings (denoted f(U)), which includes an embedding for each of the one or more historical unlabeled data records (U) 606.

The event classification module 616, for each target data record (d) 604, obtains f(G) and f(d) and computes a first set of similarity scores as shown at block 620. The first set of similarity scores includes similarity scores between the target data record, d, and each of the one or more historical anomalous data records 602.

The event classification module 616 performs a test to check if any similarity score in the first set satisfies a first threshold as shown at block 622. If yes, then the target data record, d, is classified as anomalous as shown at block 624. Otherwise, the event classification module 616 obtains f(U) and f(d) and computes a second set of similarity scores as shown at block 626. The second set of similarity scores includes similarity scores between the target data record, d, and each of the one or more historical unlabeled data records (U) 606.

The event classification module 616 then determines a number, A, of similarity scores in the first set and a number, B, of similarity scores in the second set that satisfy a second threshold as shown at block 628. The event classification module 616 performs a test to check if any A is greater than B as shown at block 630. If yes, then the target data record, d, is classified as anomalous as shown at block 624. If no, the target data record, d, is classified as regular as shown at block 632. As non-limiting examples, the first threshold can be set to a value of 0.99, and the second threshold can be set to a value between 0.5 and 0.99 (e.g., 0.95). In some embodiments, if A is equal to B, then the target data record, d, is classified as non-anomalous.

In some embodiments, if the event classification module 616 classifies the target data record as being anomalous, then one or more automated actions can be initiated. For example, if the target data record corresponds to a gray market transaction, then the system can automatically prevent the transaction from being processed and/or send one or more alerts related to the gray market transaction as non-limiting examples.

Figure 7:
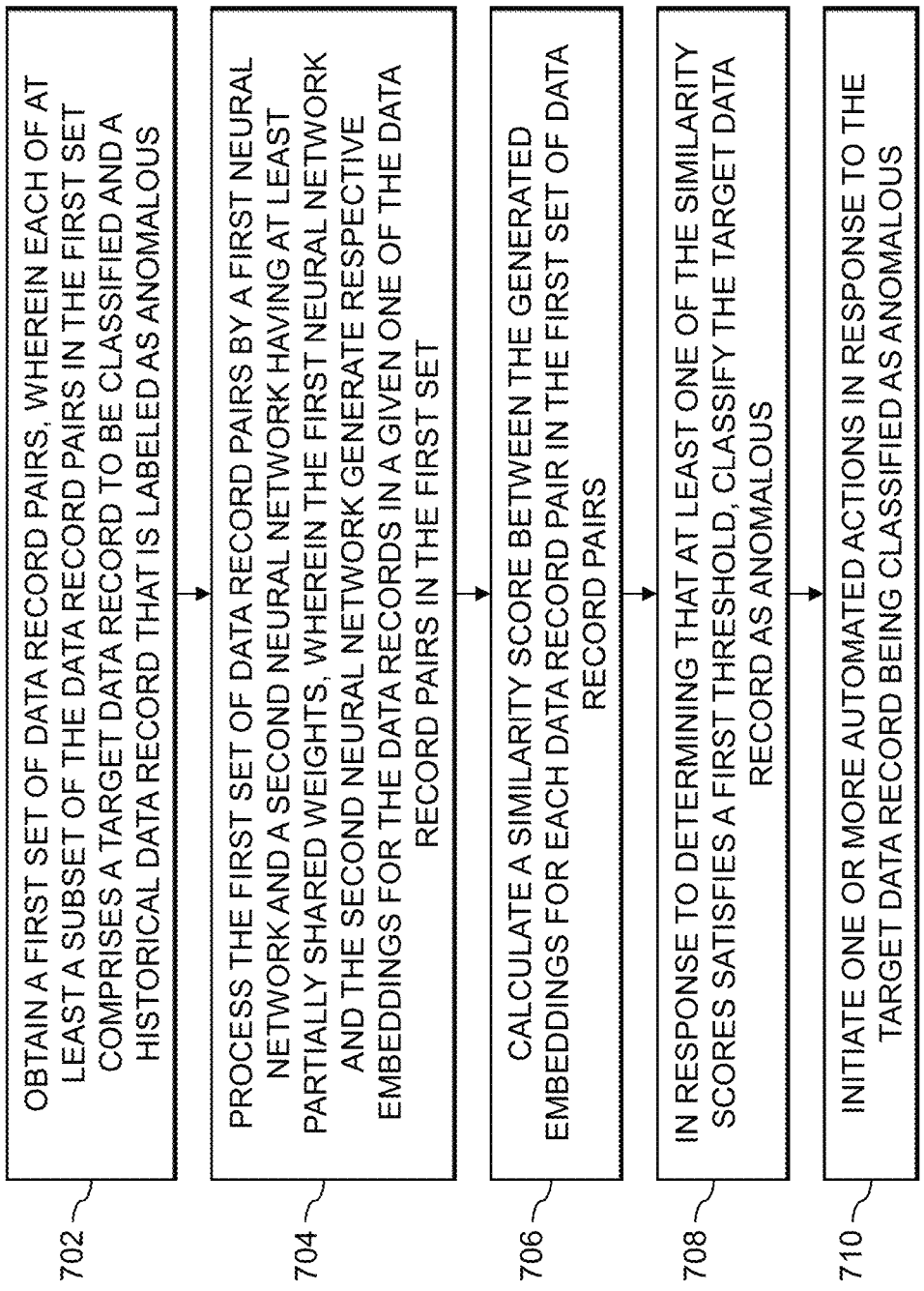
FIG. 7 shows a flow diagram of a process for machine learning-based anomaly detection in an illustrative embodiment.

FIG. 7 is a flow diagram of a process for machine learning-based anomaly detection in an illustrative embodiment. It is to be understood that this particular process is only an example, and additional or alternative processes can be carried out in other embodiments.

In this embodiment, the process includes steps 702 through 710. These steps are assumed to be performed by the anomalous event detection system 105 utilizing its elements 112, 114, 116 and 118.

Step 702 includes obtaining a first set of data record pairs, wherein each of at least a subset of the data record pairs in the first set comprises a target data record to be classified and a historical data record that is labeled as anomalous.

Step 704 includes processing the first set of data record pairs by a first neural network and a second neural network having at least partially shared weights, wherein the first neural network and the second neural network generate respective embeddings for the data records in a given one of the data record pairs in the first set.

Step 706 includes calculating a similarity score between the generated embeddings for each data record pair in the first set of data record pairs.

Step 708 includes, in response to determining that at least one of the similarity scores satisfies a first threshold, classifying the target data record as anomalous.

Step 710 includes initiating one or more automated actions in response to the target data record being classified as anomalous.

The process may further include obtaining a second set of data record pairs, where at least a subset of the second set of data record pairs comprises the target data record and a historical data record that is unlabeled, processing the second set of data record pairs by the first neural network and the second neural network to generate respective embeddings for the data records in each of the data record pairs in the second set, calculating a similarity score between the generated embeddings for each data record pair in the second set of data record pairs, and determining whether to classify the target data record as anomalous based at least in part on the similarity scores calculated for the second set of data record pairs and a second threshold.

The determining whether to classify the target data record as anomalous may include determining that an amount of the similarity scores calculated for the first set of data record pairs that satisfy the second threshold is greater than an amount of the similarity scores calculated for the second set of data record pairs that satisfy the second threshold.

The first threshold may be higher than the second threshold. The first neural network and the second neural network may include a same neural network architecture.

The first neural network and the second neural network may include feedforward neural networks.

The calculated similarity score may correspond to at least one of a Euclidean distance and a cosine similarity.

The one or more automated actions may include at least one of sending one or more alerts to at least one user, logging information related to the target data record, initiating an execution of one or more processes associated with the target data record and preventing an execution of one or more processes associated with the target data record.

The target data record may correspond to an unauthorized transaction corresponding to at least one of a product and a service, and the one or more automated actions may include preventing the unauthorized transaction from being completed by one or more computing systems.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to provide improved techniques for rare event anomaly detection using few-shot learning with a twin network architecture. Additionally, in at least some embodiments, additional scenarios of similarity and dissimilarity are generated based on existing data samples, which can then be used to train the twin network architecture to improve the performance of the machine learning model. Additionally, at least some embodiments use a multi-staged classification strategy, where data samples are classified based on scores indicating a similarity of the data samples to examples in one or more classes of interest, for example. Such embodiments can improve recall and reduce false negatives in situations where limited training data is available relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
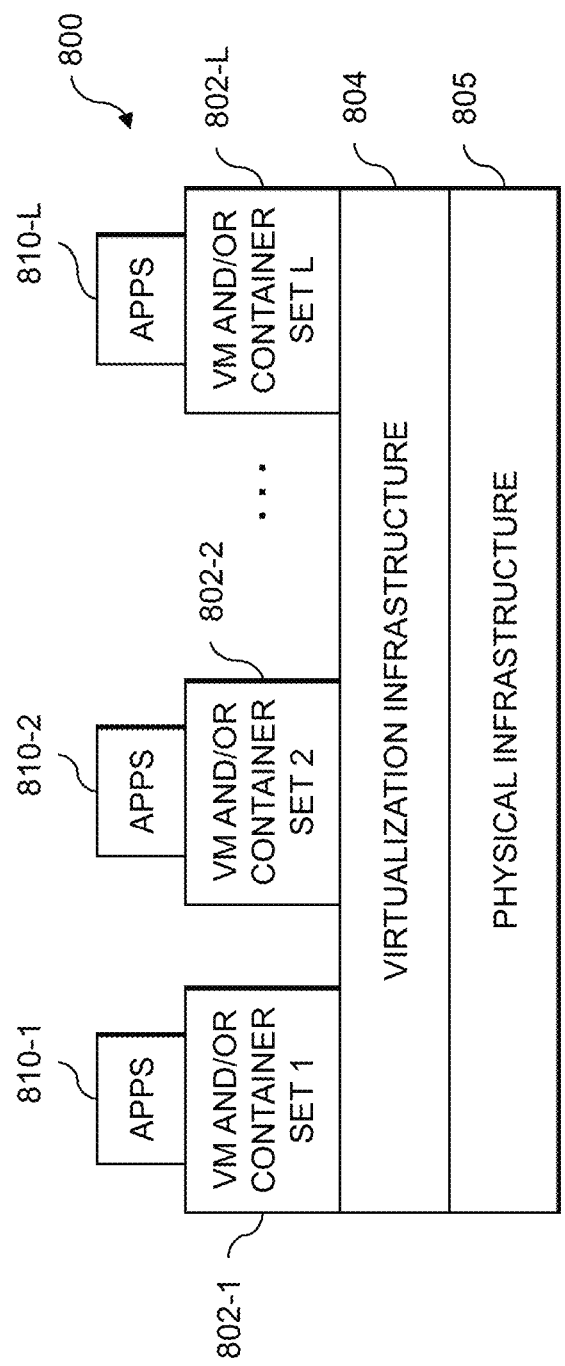
FIGS. 8 and 9 show examples of processing platforms that may be utilized to implement at least a portion of an information processing system in illustrative embodiments.
Figure 9:
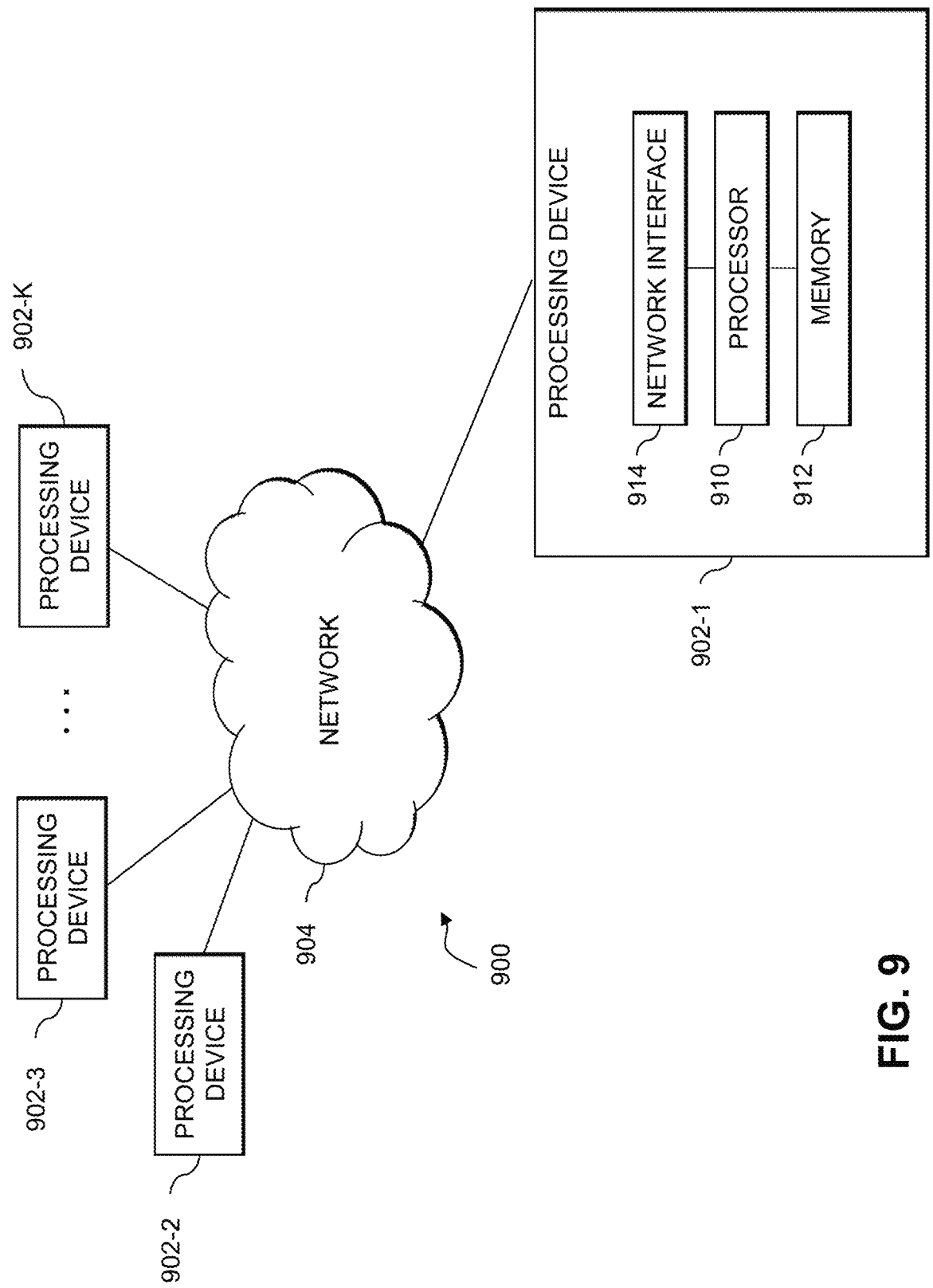

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, wherein the hypervisor platform has an associated virtual infrastructure management system. The underlying physical machines comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 comprises a microprocessor, a microcontroller, an ASIC, an FPGA or other type of processing circuitry, as well as portions or combinations of such circuitry elements.

The memory 912 comprises RAM, ROM or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining a first set of data record pairs, wherein each of at least a subset of the data record pairs in the first set comprises a target data record to be classified and a historical data record that is labeled as anomalous;
   processing the first set of data record pairs by a first neural network and a second neural network having at least partially shared weights, wherein the first neural network and the second neural network generate respective embeddings for the data records in a given one of the data record pairs in the first set;
   calculating a similarity score between the generated embeddings for each data record pair in the first set of data record pairs;
   in response to determining that at least one of the similarity scores satisfies a first threshold, classifying the target data record as anomalous; and
   initiating one or more automated actions in response to the target data record being classified as anomalous;
   wherein the method is performed by at least one processing device comprising a processor coupled to a memory.

2. The computer-implemented method of claim 1, further comprising:
   obtaining a second set of data record pairs, wherein at least a subset of the second set of data record pairs comprises the target data record and a historical data record that is unlabeled;
   processing the second set of data record pairs by the first neural network and the second neural network to generate respective embeddings for the data records in each of the data record pairs in the second set;
   calculating a similarity score between the generated embeddings for each data record pair in the second set of data record pairs; and
   determining whether to classify the target data record as anomalous based at least in part on the similarity scores calculated for the second set of data record pairs and a second threshold.

3. The computer-implemented method of claim 2, wherein the determining whether to classify the target data record as anomalous comprises:
   determining that an amount of the similarity scores calculated for the first set of data record pairs that satisfy the second threshold is greater than an amount of the similarity scores calculated for the second set of data record pairs that satisfy the second threshold.

4. The computer-implemented method of claim 2, wherein the first threshold is higher than the second threshold.

5. The computer-implemented method of claim 1, wherein the first neural network and the second neural network comprise a same neural network architecture.

6. The computer-implemented method of claim 1, wherein the first neural network and the second neural network comprise feedforward neural networks.

7. The computer-implemented method of claim 1, wherein the calculated similarity score corresponds to at least one of a Euclidean distance and a cosine similarity.

8. The computer-implemented method of claim 1, wherein the one or more automated actions comprise at least one of:
   sending one or more alerts to at least one user;
   logging information related to the target data record;
   initiating an execution of one or more processes associated with the target data record; and
   preventing an execution of one or more processes associated with the target data record.

9. The computer-implemented method of claim 1, wherein:
   the target data record corresponds to an unauthorized transaction corresponding to at least one of a product and a service; and
   the one or more automated actions comprise preventing the unauthorized transaction from being completed by one or more computing systems.

10. A non-transitory processor-readable storage medium having stored therein program code of one or more software programs, wherein the program code when executed by at least one processing device causes the at least one processing device:
    to obtain a first set of data record pairs, wherein each of at least a subset of the data record pairs in the first set comprises a target data record to be classified and a historical data record that is labeled as anomalous;
    to process the first set of data record pairs by a first neural network and a second neural network having at least partially shared weights, wherein the first neural network and the second neural network generate respective embeddings for the data records in a given one of the data record pairs in the first set;
    to calculate a similarity score between the generated embeddings for each data record pair in the first set of data record pairs;
    in response to determining that at least one of the similarity scores satisfies a first threshold, to classify the target data record as anomalous; and
    to initiate one or more automated actions in response to the target data record being classified as anomalous.

11. The non-transitory processor-readable storage medium of claim 10, wherein the program code when executed by at least one processing device further causes the at least one processing device:
    to obtain a second set of data record pairs, wherein at least a subset of the second set of data record pairs comprises the target data record and a historical data record that is unlabeled;
    to process the second set of data record pairs by the first neural network and the second neural network to generate respective embeddings for the data records in each of the data record pairs in the second set;
    to calculate a similarity score between the generated embeddings for each data record pair in the second set of data record pairs; and to determine whether to classify the target data record as anomalous based at least in part on the similarity scores calculated for the second set of data record pairs and a second threshold.

12. The non-transitory processor-readable storage medium of claim 11, wherein the determining whether to classify the target data record as anomalous comprises:
determining that an amount of the similarity scores calculated for the first set of data record pairs that satisfy the second threshold is greater than an amount of the similarity scores calculated for the second set of data record pairs that satisfy the second threshold.

13. The non-transitory processor-readable storage medium of claim 11, wherein the first threshold is higher than the second threshold.

14. The non-transitory processor-readable storage medium of claim 10, wherein the first neural network and the second neural network comprise a same neural network architecture.

15. The non-transitory processor-readable storage medium of claim 10, wherein the first neural network and the second neural network comprise feedforward neural networks.

16. An apparatus comprising:
at least one processing device comprising a processor coupled to a memory;
the at least one processing device being configured:
to obtain a first set of data record pairs, wherein each of at least a subset of the data record pairs in the first set comprises a target data record to be classified and a historical data record that is labeled as anomalous;
to process the first set of data record pairs by a first neural network and a second neural network having at least partially shared weights, wherein the first neural network and the second neural network generate respective embeddings for the data records in a given one of the data record pairs in the first set;
to calculate a similarity score between the generated embeddings for each data record pair in the first set of data record pairs;
in response to determining that at least one of the similarity scores satisfies a first threshold, to classify the target data record as anomalous; and
to initiate one or more automated actions in response to the target data record being classified as anomalous.

17. The apparatus of claim 16, wherein the at least one processing device is further configured:
to obtain a second set of data record pairs, wherein at least a subset of the second set of data record pairs comprises the target data record and a historical data record that is unlabeled;
to process the second set of data record pairs by the first neural network and the second neural network to generate respective embeddings for the data records in each of the data record pairs in the second set;
to calculate a similarity score between the generated embeddings for each data record pair in the second set of data record pairs; and
to determine whether to classify the target data record as anomalous based at least in part on the similarity scores calculated for the second set of data record pairs and a second threshold.

18. The apparatus of claim 17, wherein the determining whether to classify the target data record as anomalous comprises:
determining that an amount of the similarity scores calculated for the first set of data record pairs that satisfy the second threshold is greater than an amount of the similarity scores calculated for the second set of data record pairs that satisfy the second threshold.

19. The apparatus of claim 17, wherein the first threshold is higher than the second threshold.

20. The apparatus of claim 16, wherein the first neural network and the second neural network comprise a same neural network architecture.

* * * * *